(No Model.)
R. M. ROBERTS.
GLASS CARRYING VEHICLE.
No. 499,593. Patented June 13, 1893.
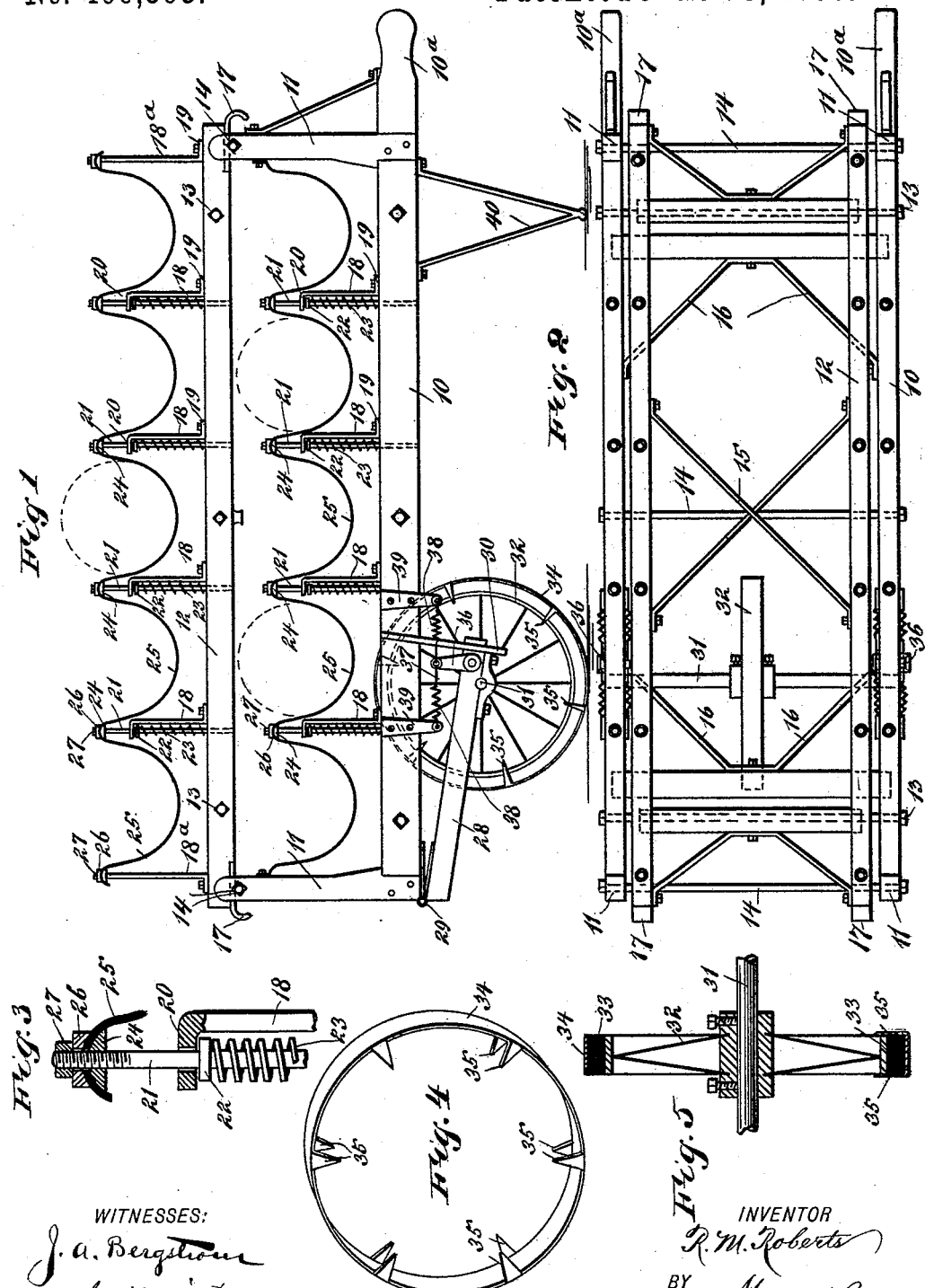
WITNESSES:
J. A. Bergstrom
C. Sedgwick
INVENTOR
R. M. Roberts
BY
Munn & Co
ATTORNEYS.

UNITED STATES PATENT OFFICE.

ROBERT M. ROBERTS, OF ANDERSON, INDIANA.

GLASS-CARRYING VEHICLE.

SPECIFICATION forming part of Letters Patent No. 499,593, dated June 13, 1893.

Application filed October 1, 1892. Serial No. 447,538. (No model.)

*To all whom it may concern:*

Be it known that I, ROBERT M. ROBERTS, of Anderson, in the county of Madison and State of Indiana, have invented certain new and useful Improvements in Glass-Carrying Vehicles, of which the following is a full, clear, and exact description.

My invention relates to improvements in vehicles which are adapted for use in conveying glass cylinders from the point where they are blown to the place where they are to be further operated upon, and the invention is an improvement on the device for which I filed an application for Letters Patent of the United States, February 23, 1892, Serial No. 422,452.

The object of my present invention is to improve the construction of the apparatus shown in my former application, so as to enable it to be more conveniently operated, also to provide the main wheel with a cushion which will not be cut by glass, and to arrange and support the cylinder-carrying belts in such a way that cylinders cannot be jarred and broken.

A further object of my invention is to suspend the main frame of the apparatus in such a springy and easy manner that it cannot give any sudden shock to glass cylinders which it carries.

To these ends my invention consists in certain features of construction and combinations of the same, as will be hereinafter described and claimed.

Reference is to be had to the accompanying drawings forming a part of this specification, in which similar figures of reference indicate corresponding parts in all the views.

Figure 1 is a side elevation of the vehicle embodying my invention. Fig. 2 is a sectional plan of the same. Fig. 3 is an enlarged detail sectional view of one of the belt hangers or supports. Fig. 4 is a detail perspective view of the protective rim which is placed over the rubber tire of the vehicle wheel; and Fig. 5 is a detail cross section of the wheel as applied to its axle.

The main features of the vehicle shown in the accompanying drawings are similar to those illustrated in my former application, and my invention consists chiefly of certain details which will be pointed out below.

The vehicle has a lower frame 10 at the corners of which are vertical posts 11 and these posts carry an upper frame 12 which is supported between the posts on cross rods 13, the frames 10 and 12 being braced by the cross braces 14, 15 and 16, in substantially the manner described in my former application. The upper frame is also provided with hooks 17 which project from its ends and which are adapted to engage the rods 14 and prevent the frame from sliding off. The above construction forms no part of this invention. The frames 10 and 12 are provided on opposite sides with brackets or hangers 18 and 18$^a$, the latter being arranged at the ends of the upper frame, and the brackets have base flanges 19 which enable them to be conveniently secured to the frames 10 and 12, and the brackets 18 have horizontal flanges 20 at the top in which slide vertically the rods 21, these rods having collars 22, (see Fig. 3,) beneath the flanges 20, and the rods are normally held upward by spiral springs 23 which are arranged between the frames and the collars 22; the lower ends of the rods also slide in the side pieces of the frames. The rods 21 are threaded at the top and each rod has screwed upon its upper end a clamping plate 24 with a convex upper surface, and upon these clamping plates the belts 25 are placed, the belts being perforated so as to slip down over the rods, as shown in Fig. 3. Each rod 21 has a second clamping plate 26 which is concave on the under side and adapted to rest upon the rod and belt so as to clamp the belt between itself and the lower clamping plate. The upper clamping plate 26 is forced downward by a nut 27 on the top of the rod 21. The belt 25 is arranged, as shown in my former application, that is, with a sag between each pair of supports or hangers so that the cylinders may be carried safely in the sags, as shown by dotted lines in Fig. 1. The arrangement of the spring hangers just described is a novel feature of the invention, and forms a part of my improvements.

Hinged to the front end of the frame 10 on opposite sides and extending rearward beneath the frame are swinging arms or timbers 28, the front ends of which connect with the frame by hinges 29 and the rear ends of the timbers or arms are held to move between guides 30 which prevent the vehicle from swaying sidewise in relation to the arms.

Journaled in boxes on the arms is the axle 31, which extends transversely beneath the frame 10 and is provided with a wheel 32, this being arranged near the center of the axle, as shown in Fig. 2. This wheel 32 has the usual felly, spokes and hub which are preferably arranged somewhat after the fashion of an ordinary bicycle wheel, and the wheel has a thick rubber tire 33 which serves as a cushion and enables the wheel to move without jarring or shocking the vehicle. Around the glass works, however, the tire would be badly cut if not covered, and to obviate this difficulty it is covered by a metallic rim 34 which is wide enough to extend across the face of the tire, and the rim has side lugs 35 which project inward beyond the felly of the wheel so as to hold the rim in place. The rim is thus held loosely to the wheel so that the cushion effect of the rubber is not interfered with.

Near the rear end of the arms 28 are upwardly extending cranks 36 which are pivoted on the arms, and these at their upper ends are secured to cables 37 which are arranged parallel with the sides of the frame 10 and connected to spiral springs 38, these springs being thus produced in front and rear of the cranks, and the springs are carried by brackets 39 on the sides of the frame 10. This construction forms a very springy and easy manner of suspending the frame 10 and this, in connection with the cushioned wheel and the spring hangers for the belts, enables the cylinders to be carried so that they cannot possibly be broken by the jar of the vehicle. The frame 10 at one end terminates in handles 10ª, and this end is also provided with a suitable supporting leg 40.

The vehicle is used in the manner described in my former application; that is, the upper frame 12 is removed, the cylinders placed in the sags of the belt 25 on the lower frame 10, after which the frame 12 is placed in position and this may be loaded either before or after it is placed above the frame 10.

Having thus described my invention, I claim as new and desire to secure by Letters Patent—

1. In a glass carrying vehicle, the combination with the vehicle frame, of parallel spring suspended belts carried upon the frame and formed into a series of sags adapted to carry glass cylinders, substantially as described.

2. In a glass carrying vehicle, the combination with the frame, of the supporting brackets having top flanges, the spring-pressed rods held to slide in the flanges, and the belts secured to the upper ends of the rods and formed into a series of glass carrying sags, substantially as described.

3. In a glass carrying vehicle, the combination with the frame, of brackets secured thereon and having flanges at their free ends, spring-pressed rods held to slide in the frame and in the flanges of the brackets, separable clamping plates carried by the rods, belts held between the clamping plates and formed into a series of glass carrying sags, and means for fastening the clamping plates upon the belts, substantially as described.

4. In a glass carrying vehicle, the combination with the main frame adapted to carry cylinders of glass, the swinging arms hinged to the front end of the frame and extending rearward beneath the frame and the supporting axle journaled in the arms, of upwardly extending cranks pivoted on the arms, and springs connected with the cranks and extending forward and backward from the same, the springs being also secured to the frame of the vehicle, substantially as described.

ROBERT M. ROBERTS.

Witnesses:
JOHN A. NIXON,
W. S. ROBERTS.